Patented Sept. 4, 1945

2,384,419

UNITED STATES PATENT OFFICE 2,384,419

AZO DYESTUFFS

Richard Fleischhauer and Adolf Müller, Frankfort-on-the-Main-Fechenheim, and Carl Theo Schultis, Bergen, near Frankfort-on-the-Main, Germany, assignors to General Aniline & Film Corporation, New York, N. Y., a corporation of Delaware No Drawing. Application July 29, 1941, Serial No. 404,508. In Germany June 24, 1940

4 Claims. (Cl. 260—176)

Our present invention relates to azodyestuffs, more particularly to those of the general formula:

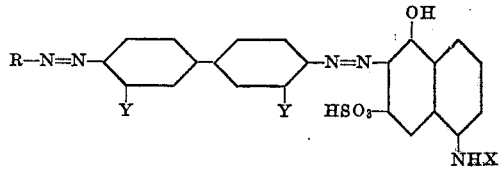

where X represents a phenyl radical, Y is selected from the group consisting of —COOH and —OCH₂COOH, the Y's being identical, and R represents a coupled radical selected from the group consisting of pyrazolones, aminohydroxynaphthalenes and acetoacetic acid arylides. The dyestuffs wherein R is an amino naphthol sulfonic acid are of particular value.

The present new azodyestuffs are obtained by combining tetrazo-compounds corresponding with the general formula

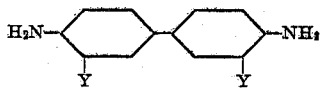

wherein Y is as defined above, with 1-arylamino-5-hydroxynaphthalene-7-sulfonic acids, which are obtainable by acting with aromatic amines, advantageously in the presence of salts thereof, on 1-amino-5-hydroxy-naphthalene-7-sulfonic acid or 1-aminonaphthalene-5.7-disulfonic acid, in the latter case aftertreating the primary condensation products with caustic alkalies, or by decomposing the 1-amino-5-hydroxynaphthalene-7-sulfonic acid or 1.5-dihydroxynaphthalene-7-sulfonic acid with aromatic amines in the presence of salts of sulfurous acid.

The present azodyestuffs dye the animal and cellulosic fibers, particularly cotton and viscose silk valuable shades of good fastness properties, especially bright gray shades of a very good fastness to light, which are of a particular importance, or other covered shades having a grayish constituent, such as brownish, olive-greenish or blackish shades. Since the combination with the 1-arylamino-5-hydroxynaphthalene-7-sulfonic acids is advantageously carried out in a neutral or preferably alkaline medium, whereby the azo group generally enters into the ortho-position to the hydroxy group, it is possible to convert the dyestuffs in substance or on the fiber in their metallic complex compounds, containing particularly copper or chromium, the dyeings of which are distinguished by a particular fastness to washing and mostly to light.

So far as the dyestuffs contain in the nucleus signified by X in the aforesaid general formula or in an other place within the molecule the radicle of the salicylic acid group they yield very fast dyeings to washing when treated on the fiber with metal salts, particularly with chromic salts.

The following examples serve to illustrate the invention, but they are not intended to limit it thereto, the parts being by weight and all temperatures in degrees centigrade.

Example 1

The alkaline tetrazosolution, containing sodium-carbonate, of 27.2 parts of 4.4'-diaminodiphenyl-3.3'-dicarboxylic acid is combined while cooling with a neutral solution of 31.5 parts of 1-phenylamino-5-hydroxynaphthalene-7-sulfonic acid. The formed intermediate is combined in the presence of an excess of sodium carbonate with 17.4 parts of 1-phenyl-3-methyl-5-pyrazolone. The disazodyestuff thus obtained of the formula:

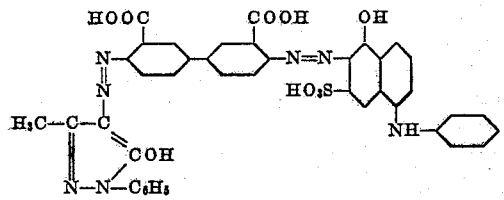

is when dry a dark powder soluble in water with a dark brown and in concentrated sulfuric acid with a dark violet color and dyes cotton violet-gray shades turning to a reddish brown shade of a good fastness to light and washing when aftertreated with copper salts.

When using a second coupling component o-methoxyanilide of acetoacetic acid or other arylides thereof the formed dyestuffs dye cotton grayish brown shades turning to a brown shade when aftertreated on the fiber with copper salts.

When using as first coupling component 1-(4'-methoxyphenylamino- or -methyl-phenylamino)-5-hydroxynaphthalene-7-sulfonic acid the formed dyestuffs dye somewhat more covered brown shades.

One may likewise combine the tetrazocompound at first with one molecular proportion of a "yellow-component" such as acetoacetic acid anilide, 1-phenyl-3-methyl-5-aminopyrazole, 1-phenyl-5-pyrazolone-3-carboxylic acid, 1-(4'-sulfophenyl)-3-methyl-5-pyrazolone and combine the formed intermediate in an alkaline solution with 1-(4'-aminodiphenylamine)-5-hydroxynaphthalene-7-sulfonic acid.

The formed dyestuffs dye when aftertreated on the fiber with copper salts yellowish to reddish brown shades of a very good fastness to light and a particular fastness to washing.

When using as tetrazocompound 4.4'-diaminodiphenyl-3,3'-dihydroxyacetic acid dyestuffs of similar brown shades are obtained.

Example 2

The tetrazocompound of 33.2 parts of 4.4'-diaminodiphenyl - 3,3' - dihydroxyacetic acid is combined in the presence of an excess of sodium carbonate with 63 parts of 1-phenylamino-5-hydroxynaphthalene-7-sulfonic acid. The formed disazodyestuff of the formula:

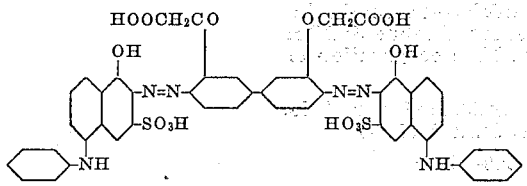

is when dry a violet-black powder soluble in water with a blue and in concentrated sulfuric acid with a blue and in concentrated sulfuric acid with a greenish blue color and dyes cotton blue shades turning when aftertreated with copper salts into a neutral gray of good fastness to light and washing.

The same dyestuff may be prepared by an inverse sequence of the coupling processes.

When using as one coupling component other 1 - arylamino - 5 - hydroxynaphthalene - 7 - sulfonic acids such as for instance the 4'-methoxyphenylamino- or the 4'-aminodiphenylamino-compound and aftertreating the dyeings obtained with the formed dyestuffs on the fiber with copper salts a little more reddish neutral gray shades of very good fastness particularly to washing are obtained.

The particularly valuable dyestuff of the formula:

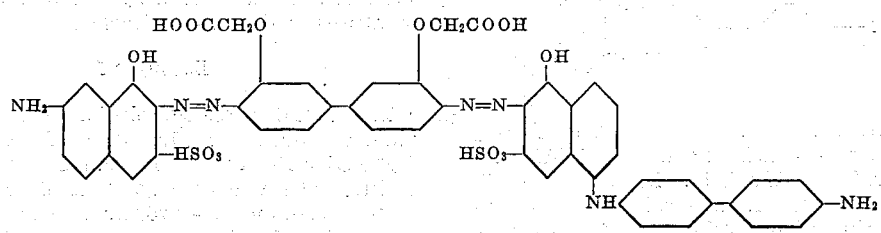

with a greenish blue color and dyes cotton blue shades turning when aftertreated with copper salts to a neutral gray shade of a good fastness to water and washing and a very good fastness to light.

When using as coupling component the 1-(4'-methoxyphenylamino- or -methyl-phenyl-amino)-5-hydroxynaphthalene-7-sulfonic acid the formed dyestuffs dye when aftertreated with copper salts somewhat more reddish gray shades of good fastness.

Example 3

When combining the tetrazo compound of 33.2 parts of 4.4'-diaminodiphenyl-3.3'-dihydroxyacetic acid with 31.5 parts of 1-phenylamino-5-hydroxynaphthalene-7-sulfonic acid and combining the intermediate thus formed with 24 parts of 2 - amino - 8 - hydroxynaphthalene-6-sulfonic acid the formed disazodyestuff of the formula:

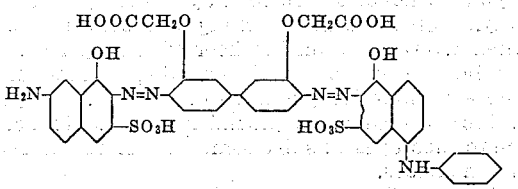

is when dry a dark powder soluble in water is when dry a dark powder and dyes cotton blue shades, turning to a gray shade of a very good fastness to washing and light when aftertreated with copper salt.

When replacing in the aforesaid combinations the 2 - amino-8-hydroxynaphthalene-6-sulfonic acid by 1-amino-5-hydroxynaphthalene-7-sulfonic acid the dyestuffs obtained dye cotton when aftertreated with copper compounds more bluish gray shades of a similar good fastness to washing and a very good fastness to light, or when replacing it by other hydroxynaphthalene compounds such as 1-acetylamino-5-hydroxy-naphthalene or 1-(2'-carboxybenzoyl-amino)-7-hydroxynaphthalene the aftertreated dyeings are of a full and bluish respectively gray shade.

Example 4

The tetrazocompound of 33.2 parts of 4.4'-diaminodiphenyl-3.3'-dihydroxyacetic acid is combined with 36.5 parts of 1-(4'-methoxyphenylamino)-5-hydroxynaphthalene-7-sulfonic acid and the formed intermediate with 34.4 parts of the dyestuff, obtained by combining in an acid medium diazobenzene with 2-amino-5-hydroxynaphthalene-7-sulfonic acid.

The trisazodyestuff thus obtained of the formula:

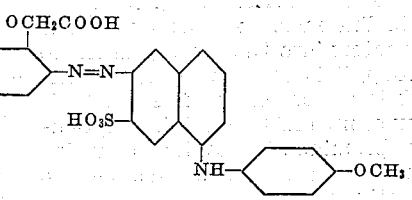

is when dry a dark brown powder soluble in water with a blue and in concentrated sulfuric acid with a dark green color and dyes cotton when aftertreated with copper salts fast neutral gray shades.

When combining the aforesaid intermediate with the dyestuff, obtained by combining in an acid medium 1-diazo-4-hydroxybenzene-3-carboxylic acid with 2-amino-5-hydroxynaphthalene-7-sulfonic acid the formed trisazodyestuff dyes cotton somewhat more covered gray shades.

*Example 5*

The intermediate obtained according to Example 3 by combining the tetrazocompound of 33.2 parts of 4.4'-diamino-diphenyl-3.3'-dihydroxy-acetic acid with 31.5 parts of 1-phenylamino-5-hydroxynaphthalene-7-sulfonic acid is further combined with a solution of 23.9 parts of 2 - amino - 5 - hydroxynaphthalene-7-sulfonic acid in the presence of an excess of sodium bicarbonate. The aminodisazodyestuff thus formed is diazotized again and combined in the presence of an excess of sodium carbonate with 19.1 parts of acetoacetic acid ortho anisidide. The dyestuff thus obtained of the formula:

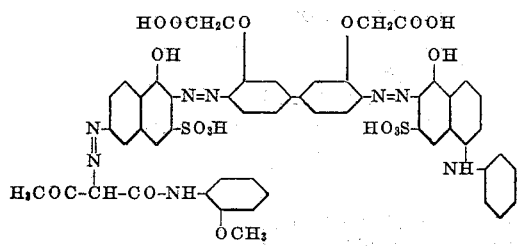

is when dry a dark powder soluble in water with a bluish gray, in concentrated sulfuric acid with a bluish green color and dyes cotton bluish gray shades turning when aftertreated with copper salts to a more reddish gray of a very good fastness to washing and light.

When using as final component 3-methylpyrazolone the formed dyestuff dyes cotton neutral bluish gray shades of a very good fastness to washing when aftertreated with copper salts, when using as final component 8-hydroxyquinoline the aftertreated dyeing exhibits a somewhat more reddish gray shade of good fastness to washing.

When coupling the aforesaid intermediate with other diazotisable amino-hydroxy naphthalines, which may have an hydroxy group etherified by an alkyl group, such as 1-amino-5-hydroxynaphthalene-7-sulfonic acid, 2 - amino - 8 - hydroxynaphthalene-6-sulfonic acid, 1-amino-2-ethoxynaphthalene-6-sulfonic acid, 1 - amino - 7 - hydroxynaphthalene-3-sulfonic acid, 1-amino-8-hydroxynaphthalene-4-sulfonic acid, 1-amino-8-hydroxynaphthalene-5-sulfonic acid, 1-amino-8-hydroxynaphthalene-6-sulfonic acid, 1-amino-8-hydroxynaphthalene-3.6-disulfonic acid and di- azotizing the formed aminodisazodyestuffs and combining with the aforesaid final components, advantageously in the presence of pyridine and sodiumbicarbonate the formed dyestuffs dye, when aftertreating the dyeings with copper salts, cotton reddish to greenish to neutral gray shades of a good fastness to washing and light.

When using as middle component 23.9 parts of 2 - amino-6-hydroxynaphthalene - 8 - sulfonic acid and as final component 19.1 parts of acetoacetic acid ortho-anisidide the formed dyestuff is soluble in water and concentrated sulfuric acid with a green color and dyes cotton dark green shades turning to olive green shades of a very good fastness to washing and light when aftertreated with copper salts.

*Example 6*

The tetrazocompound of 33.2 parts of 4.4'-diaminodiphenyl-3.3'-dihydroxyacetic acid is combined in the presence of an excess of sodium carbonate with 77 parts of 1-(3'-carboxyphenylamino)-5-hydroxynaphthalene-7-sulfonic acid. The formed dyestuff of the formula:

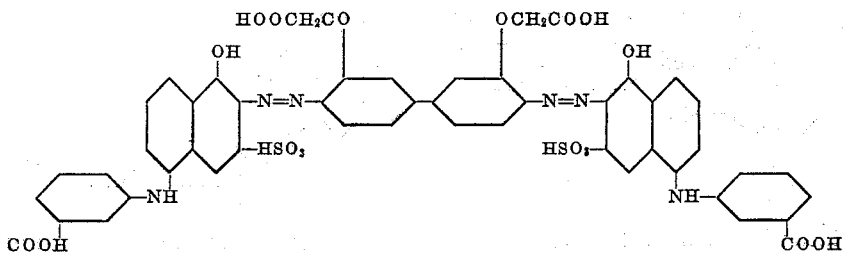

is converted into the copper complex compound in the known manner by treating the aqueous solution thereof with copper sulfate in the presence of sodium acetate or ammonia. The copper complex compound is when dry a dark blue powder soluble in a dilute sodium carbonate solution with a bluish gray and in concentrated sulfuric acid with a greenish blue color. It dyes cotton neutral gray shades of a good fastness to washing and an excellent fastness to light.

When using as coupling component the 1-(5'-hydroxy - 7'- sulfo-1'-naphthylamino) benzene-4-hydroxyacetic acid of the formula:

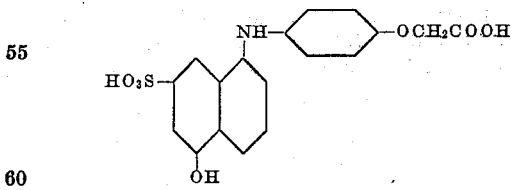

or the corresponding 4-thioglycollic acid similar dyestuffs of likewise good tinctorial properties are obtained.

*Example 7*

The intermediate derived from 33.2 parts tetrazotized 4.4' - diaminodiphenyl - 3.3' - dihydroxyacetic acid and 23.9 parts of 2-amino-8-hydroxynaphthalene-6-sulfonic acid is combined with 35.9 parts of 1-(3'-carboxyphenyl-amino)-5-hydroxy-7-sulfonic acid in the presence of an excess of sodiumbicarbonate. The formed diazodyestuff of the formula:

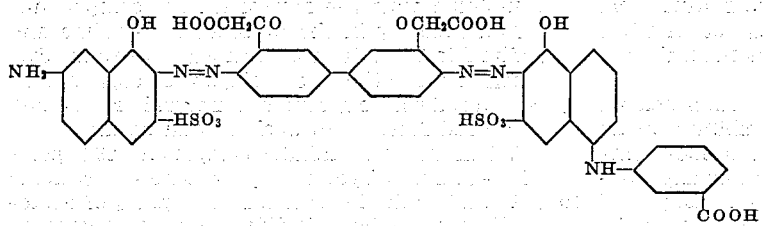

is converted into the copper complex compound as described in Example 6. It is a dark violet powder soluble in a dilute sodiumcarbonate solution with a bluish green and in concentrated sulfuric acid with a greenish blue color. It dyes cotton neutral gray shades of a good fastness to light and washing.

When replacing the 2-amino-8-hydroxynaphthalene-6-sulfonic acid by the 1-amino-5-hydroxy-naphthalene-7-sulfonic acid the formed dyestuff dyes bluish gray shades. Similar dyestuffs are obtained when using as final components the coupling components which are mentioned in the last paragraph of Example 6.

We claim:

1. The azo dyestuffs of the formula

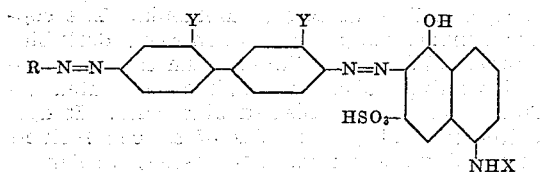

where X is a phenyl radical, Y is selected from the group consisting of COOH and OCH$_2$COOH, the Y's being identical, and R represents a coupled radical selected from the group consisting of pyrazolones, amino-hydroxy naphthalenes, and aceto-acetic acid arylides, which dyestuffs dye animal and cellulosic fibers shades of good fastness to light and washing.

2. The azodyestuff of the formula:

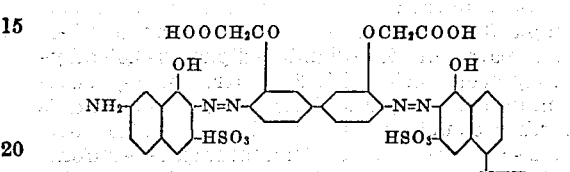

wherein X is a phenyl radical.

3. The azodyestuff of the formula:

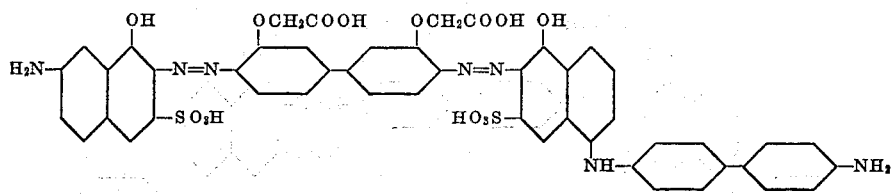

which dyestuff is when dry a dark powder and dyes cotton blue shades turning to a gray shade of a very good fastness to washing and light when aftertreated with copper salt.

4. The azodyestuff of the formula:

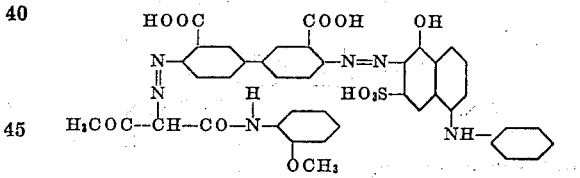

which dyestuff is when dry a dark powder and dyes cotton grayish brown shades turning to a brown shade of a good fastness to washing and light when aftertreated with copper salts.

RICHARD FLEISCHHAUER.
ADOLF MÜLLER.
CARL THEO SCHULTIS.